United States Patent
Lacey et al.

(10) Patent No.: US 11,720,332 B2
(45) Date of Patent: Aug. 8, 2023

(54) COMPILING A PROGRAM FROM A GRAPH

(71) Applicant: Graphcore Limited, Bristol (GB)

(72) Inventors: David Lacey, Cheltenham (GB); Godfrey Da Costa, Bristol (GB)

(73) Assignee: GRAPHCORE LIMITED, Bristol (GB)

(*) Notice: Subject to any disclaimer, the term of this patent is extended or adjusted under 35 U.S.C. 154(b) by 0 days.

(21) Appl. No.: 16/527,410

(22) Filed: Jul. 31, 2019

(65) Prior Publication Data
US 2020/0319861 A1    Oct. 8, 2020

(30) Foreign Application Priority Data
Apr. 2, 2019 (GB) .................................. 1904637

(51) Int. Cl.
*G06F 8/30* (2018.01)
*G06F 8/41* (2018.01)

(52) U.S. Cl.
CPC ........................................ *G06F 8/41* (2013.01)

(58) Field of Classification Search
CPC ..... G06F 8/41; G06F 8/30; G06F 8/60; G06F 2221/033; G06F 8/34
See application file for complete search history.

(56) References Cited

U.S. PATENT DOCUMENTS

| | | | |
|---|---|---|---|
| 5,966,143 A | 10/1999 | Breternitz, Jr. | |
| 6,738,966 B1* | 5/2004 | Tanaka | G06F 8/441 717/136 |
| 6,745,277 B1* | 6/2004 | Lee | G06F 12/0607 365/230.03 |
| 2005/0289322 A1 | 12/2005 | Peri | |
| 2007/0277133 A1* | 11/2007 | Abadir | G06F 30/3323 716/102 |
| 2009/0064112 A1* | 3/2009 | Inagaki | G06F 8/441 717/140 |

(Continued)

OTHER PUBLICATIONS (Wang et al., "Software Programmable Data Allocation in Multi-Bank Memory of SIMD Processors", 2010) (Year: 2010).*

(Continued)

*Primary Examiner* — Chat C Do
*Assistant Examiner* — Noor Alkhateeb
(74) *Attorney, Agent, or Firm* — Haynes and Boone LLP

(57) ABSTRACT

A method for generating an executable program to run on one or more processor modules. The method comprises: receiving a graph comprising a plurality of data nodes, compute vertices and edges; and compiling the graph into an executable program including one or more types of multi-access instruction each of which performs at least two memory access (load and/or store) operations in a single instruction. The memory on each processor module comprises multiple memory banks whereby the same bank cannot be accessed by different load or store operations in the same instruction. The compilation comprises assigning instances of the multi-access instructions to implement at least some of the graph edges, and allocating the data to memory addresses within different ones of the banks. The allocating is performed subject to one or more constraints, including at least that different load/store operations should not access the same memory bank in the same instruction.

21 Claims, 6 Drawing Sheets

(56) References Cited

U.S. PATENT DOCUMENTS

| | | | | |
|---|---|---|---|---|
| 2010/0241683 | A1* | 9/2010 | Nakanishi | G06F 17/12 |
| | | | | 708/520 |
| 2011/0072403 | A1* | 3/2011 | Basile | G06F 30/30 |
| | | | | 716/106 |
| 2011/0161782 | A1* | 6/2011 | Engin | H03M 13/6566 |
| | | | | 714/763 |
| 2012/0158933 | A1* | 6/2012 | Shetty | H04L 41/0893 |
| | | | | 709/223 |
| 2012/0229466 | A1* | 9/2012 | Riche | G06F 16/9038 |
| | | | | 345/440 |
| 2014/0282180 | A1* | 9/2014 | Orofino | G06F 9/46 |
| | | | | 715/771 |
| 2016/0314148 | A1* | 10/2016 | Chirayath | G06F 16/215 |
| 2016/0335002 | A1* | 11/2016 | Malkin | G06F 13/1663 |
| 2016/0342899 | A1* | 11/2016 | Kabiljo | G06N 20/00 |
| 2017/0017413 | A1* | 1/2017 | Aston | G06F 3/0659 |
| 2017/0123792 | A1* | 5/2017 | Rozario | G06F 9/3001 |
| 2018/0007108 | A1* | 1/2018 | Karkkainen | H04L 49/9057 |
| 2018/0267799 | A1* | 9/2018 | Quitzk | G06F 9/30043 |
| 2019/0065201 | A1* | 2/2019 | Robinson | G06F 9/30145 |
| 2019/0377580 | A1* | 12/2019 | Vorbach | G06F 1/32 |
| 2020/0159810 | A1* | 5/2020 | Ghosh | G06F 9/3822 |

OTHER PUBLICATIONS

Combined Search and Examination Report for United Kingdom Patent Application No. GB1904637.4 dated Sep. 16, 2019.

* cited by examiner

Figure 8
| | Bank 0 | Bank 1 | Bank 2 | Bank 3 |
|---|---|---|---|---|
| 21 | 0x00 | 0x01 | 0x02 | 0x03 |
| | 0x04 | 0x05 | 0x06 | 0x07 |
| | 0x08 | 0x09 | 0x0A | 0x0B |
| | 0x0C | 0x0D | 0x0E | 0x0F |
| | 0x10 | 0x11 | 0x12 | 0x13 |
| | 0x14 | 0x15 | 0x16 | 0x17 |
| | 0x18 | 0x19 | 0x1A | 0x1B |
| | 0x1C | 0x1D | 0x1E | 0x1F |
| | ⋮ | ⋮ | ⋮ | ⋮ |
$23_0$  $23_1$  $23_2$  $23_3$
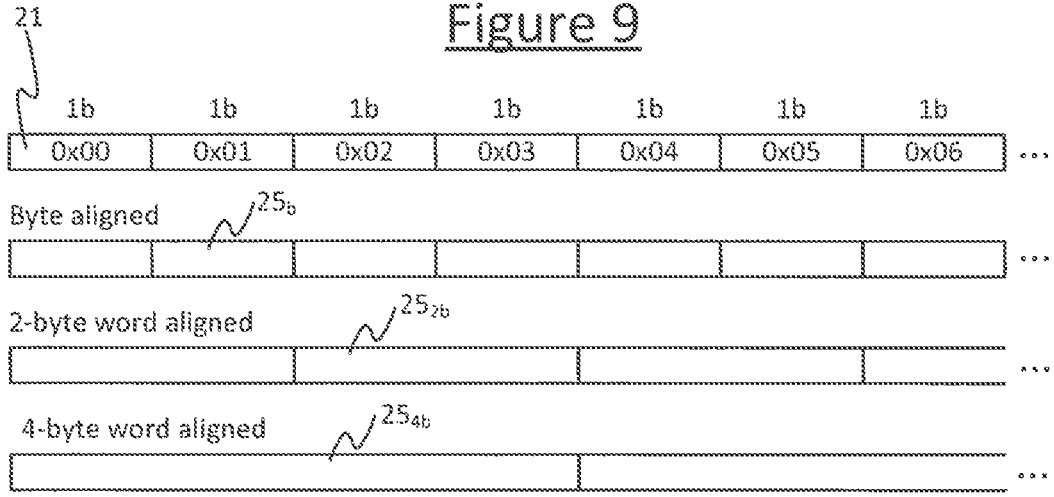
Figure 9
21
| 1b | 1b | 1b | 1b | 1b | 1b | 1b |
|---|---|---|---|---|---|---|
| 0x00 | 0x01 | 0x02 | 0x03 | 0x04 | 0x05 | 0x06 | ...
Byte aligned  $25_b$
2-byte word aligned  $25_{2b}$
4-byte word aligned  $25_{4b}$
Figure 10
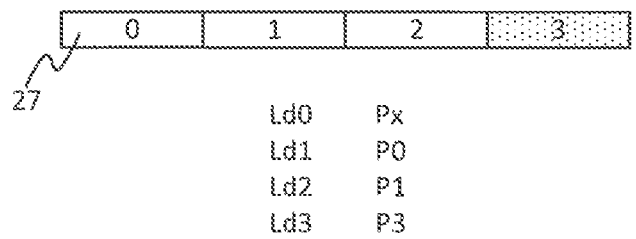
| 0 | 1 | 2 | 3 |
27
Ld0  Px
Ld1  P0
Ld2  P1
Ld3  P3

COMPILING A PROGRAM FROM A GRAPH

CROSS-REFERENCE TO RELATED APPLICATIONS

The present application claims priority to United Kingdom Patent Application No. 1904637.4, filed Apr. 2, 2019, of which is hereby incorporated by reference in its entirety.

TECHNICAL FIELD

The present disclosure relates to compiling a graph-based program to run on a processing system comprising one or more processor chips, each comprising one or more processor modules or "tiles".

BACKGROUND

Programs are typically written in a high level programming language, meaning a language which is abstracted from at least some of the specific architecture of the processor, and which is therefore more understandable to a human than the low-level machine code instructions executed by the target processor. Compilation refers to the process of taking a program written in a high-level language and lowering it to a form that can be executed by a processor, i.e. converting the high-level program into a low-level program comprising machine code instructions that can be executed by a processor. "Instruction" for the purpose of the present disclosure means a machine code instruction, i.e. an instance of one of the fundamental set of instruction types which the processor's execution unit is configured to recognize and execute. This set is referred to in the art as the instruction set of the processor. Each instruction type in the instruction set is defined by a different respective opcode mapping to a corresponding type of operation in the execution unit, and by zero or more operand fields for taking a respective zero or more operands of the operation.

Nowadays the high-level program often takes the form of a graph. For instance this can be the case where the processor comprises a plurality of processor modules, sometimes also called "tiles". Each tile comprises its own memory and execution unit (typically each configured with the same instruction set). The tiles are connected together via an on-chip interconnect which enables the pieces of code run on the different tiles to communicate with one another between tiles on the same chip (i.e. die). In some cases the system could also comprise multiple chips, each comprising multiple tiles. In this case the chips may be connected together via an external interconnect enabling tiles on different chips to communicate with one another. The graph describes a plurality of data nodes, compute vertices, and edges between nodes and/or vertices. It is the task of the compiler, amongst other things, to determine which data nodes and which vertices are to be implemented on which tiles. Thus separate portions of program code can be run in parallel on different ones of the tiles. Hence it is possible to connect together multiple independent processing resources with a high degree of parallelism.

An example application of parallel processing is found in machine intelligence. As will be familiar to those skilled in the art of machine intelligence, a machine intelligence algorithm is based around performing iterative updates to a "knowledge model", which can be represented by a network of multiple interconnected nodes or "neurones". Each neurone represents a function of its inputs. Some neurones receive the inputs to the network and some receive inputs from one or more other neurones, whilst the output of some neurones form the inputs of other neurones, and the output of some neurones provide the output of the network. Further, the function at each neurone is parameterized by one or more respective parameters, sometimes called weights (not necessarily implying multiplicative weights, though that is one possibility). During a learning stage the aim is, based on a set of experiential input data, to find values for the various weights such that the network as a whole will generate a desired output for a range of possible inputs. Various algorithms for doing this are known in the art, such as a back propagation algorithm based on stochastic gradient descent. Over multiple iterations based on the input data, the weights are gradually tuned to decrease their errors, and thus the network converges toward a solution. In a subsequent stage, the learned model can then be used to make predictions of outputs given a specified set of inputs, or to make inferences as to inputs (causes) given a specified set of outputs.

The implementation of each neurone will involve the processing of data, and the interconnections of the graph correspond to data to be exchanged between the neurones. Typically, at least some of the processing of each neurone can be carried out independently of some or all others of the neurones in the network, and therefore large neural networks expose great opportunities for parallelism.

A graph-based approach is by no means limited to multi-tile processors or parallel processing, nor to neural networks or machine intelligence applications. In general a graph may be used to describe any complex flow or interrelationship between computations and data.

SUMMARY

However, memory devices may have certain architectural constraints. In the system of the present disclosure, the memory is divided into one or more physical memory elements called banks. A given bank does not allow two different memory locations to be accessed at the same time. However, it would also be desirable to include in the instruction set one or more types of "multi-access" instruction. These are types of machine code instruction, defined in the instructions set, which perform more than one load and/or store operation in a single machine code instruction; e.g. a load-store instruction which performs a load and store in the same machine code instruction, a double-load instruction which performs two loads in the same machine code instruction, or a load-load-store which performs two loads and a store in the same machine code instruction.

These potentially conflicting features of the memory architecture and instruction set will need to be taken into account when compiling the program: i.e. a given instance of a load/store instruction should not attempt to access two different addresses in the same memory bank.

According to one aspect disclosed herein, there is provided a computer-implemented method for generating an executable program to run on a system of one or more processor chips each comprising one or more processor modules, each processor module comprising an execution unit and memory; the method comprising: receiving a graph comprising a plurality of data nodes, a plurality of compute vertices and a plurality of directional edges, each data node representing a data element, each edge representing an input to a compute vertex from a data node or an output from a compute vertex input to a data node or another compute vertex, and each compute vertex representing one or more computations to perform on its input or inputs in order to produce the output or outputs from that compute vertex;

compiling the graph into said executable program, the executable program comprising a plurality of machine code instructions, including one or more types of multi-access instruction each of which performs at least two load operations, at least two store operations, or at least one load and one store operation in a single instruction; wherein the memory on each of the processor modules comprises a respective plurality of memory banks having an architectural constraint preventing the same memory bank being accessed by different load or store operations in the same instruction; and the compilation comprises assigning instances of said multi-access instructions to implement at least some of said edges, and allocating the data elements to memory addresses within different ones of the banks, wherein said allocating is performed subject to one or more constraints including at least a constraint that different load or store operations should not access the same memory bank in the same instruction.

In embodiments, the constraints may further comprise an additional constraint on each of one or more of the edges outputting from a compute vertex, specifying that the data output by the edge should be stored with a specified alignment with respect to the memory addresses.

Alternatively or additionally, in embodiments the constraints may further comprise an additional constraint on each of one or more of the edges outputting from a compute vertex, specifying that the data output by the edge should be stored in a specified subset of the memory banks.

In embodiments the specified subset may comprise a region of interleaved memory.

As another alternative or additional example, at least one of the vertices may comprise a loop, and the constraints may further comprise an additional constraint on at least one of the edges outputting from the loop, specifying that an overspill region is left beyond the end of the memory addresses in which the data output by the edge is to be stored.

In embodiments, the multi-access instructions may include at least a load-store instruction which performs a load operation and a store operation in the same instruction.

Alternatively or additionally, the multi-access instructions may include at least a double-load instruction which performs two load operations in the same instruction.

As another alternative or additional example, the multi-access instructions may include at least a load-load-store instruction which performs two load operations and a store operation in a single instruction.

In embodiments, said allocation may optionally comprise: determining an order of the data elements; and stepping through the data elements in said order to allocate each in turn, wherein said stepping through the data elements comprises: for each current data element being allocated, finding a remaining free space in the memory that meets the constraint or constraints for the current data element, given any preceding data elements further up the order that have already been allocated a space in the memory; and allocating the current data element to the found space in memory, then moving on to the next data element in said order.

In embodiments, the order may be based on size of the data element in terms of space occupied in memory, with larger data elements being higher up the order than smaller ones.

Alternatively or additionally, the order may be based on a time the data element will be live between being created and being used by the program, or a number of lines of machine code the data element will be live for between being created and being used by the program; with data elements that are live for a longer or a greater number of lines of code, respectively, being higher up the order than those that are live for a shorter time or fewer lines of code.

In some embodiments, the determining of the order may comprises: grouping the data elements into equivalence classes, wherein each equivalence class consists of a set of the data elements that interfere with a same set of other ones of the data elements; and ordering the equivalence classes.

In embodiments, said ordering of the equivalence classes may comprise ordering the equivalence classes according to total data size of the class, number of data elements in the class, time for which the class will be live, or total number of lines of machine code for which the class will be live.

According to another aspect disclosed herein, there is provided a graph compiler in the form of a software tool embodied on computer readable storage, configured so as when run on one or more processing units of a computer to perform a method in accordance with any embodiment disclosed herein.

According to another aspect disclosed herein, there is provided a computer comprising storage comprising one or more memory units, and processing apparatus comprising one or more processing units; wherein the storages stores a graph compiler arranged to run on the processing apparatus, the graph compiler being configured so as when thus run to perform operations in accordance with any embodiment disclosed herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
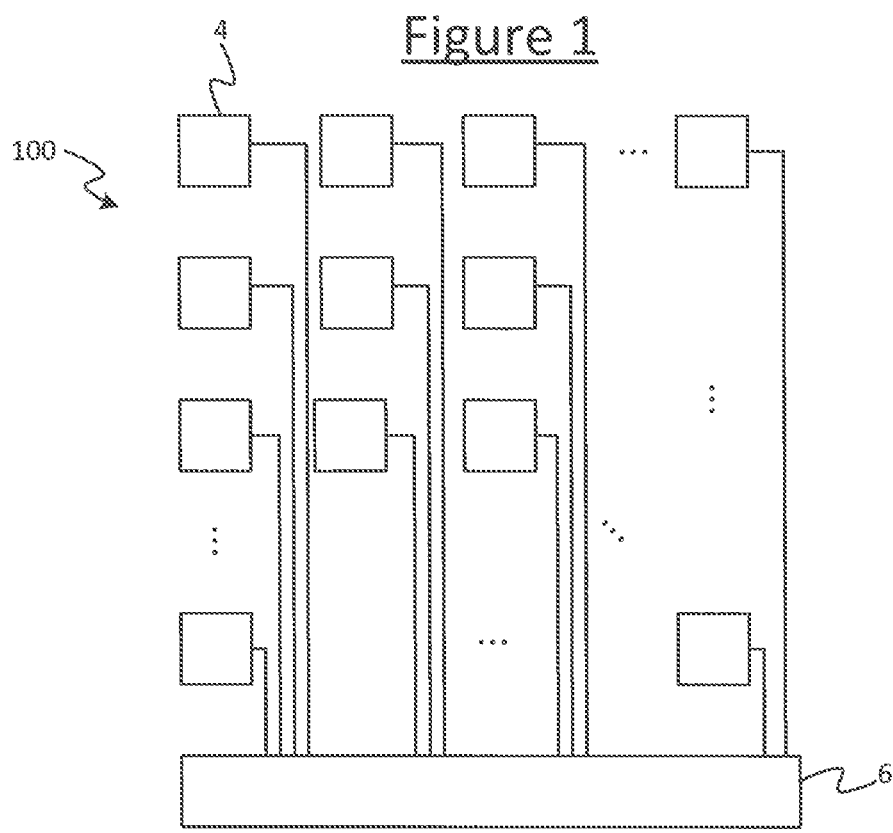
FIG. 1 is a schematic block diagram of a system comprising multiple tiles.
Figure 2:
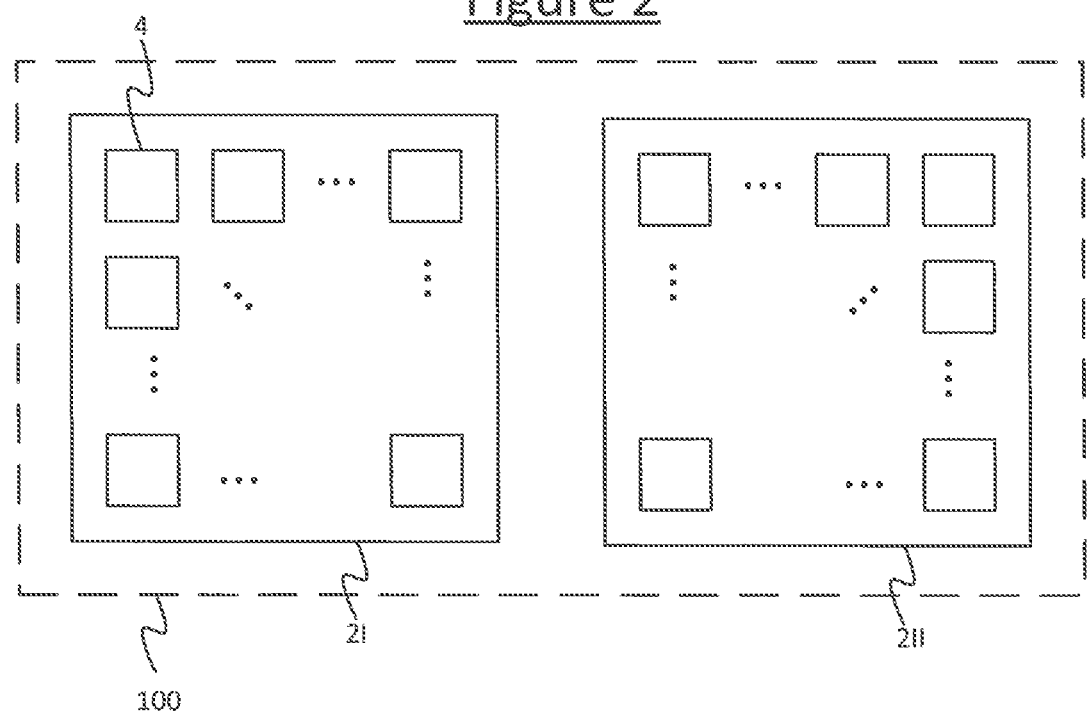
FIG. 2 is another schematic block diagram of a system comprising multiple tiles.
Figure 3:
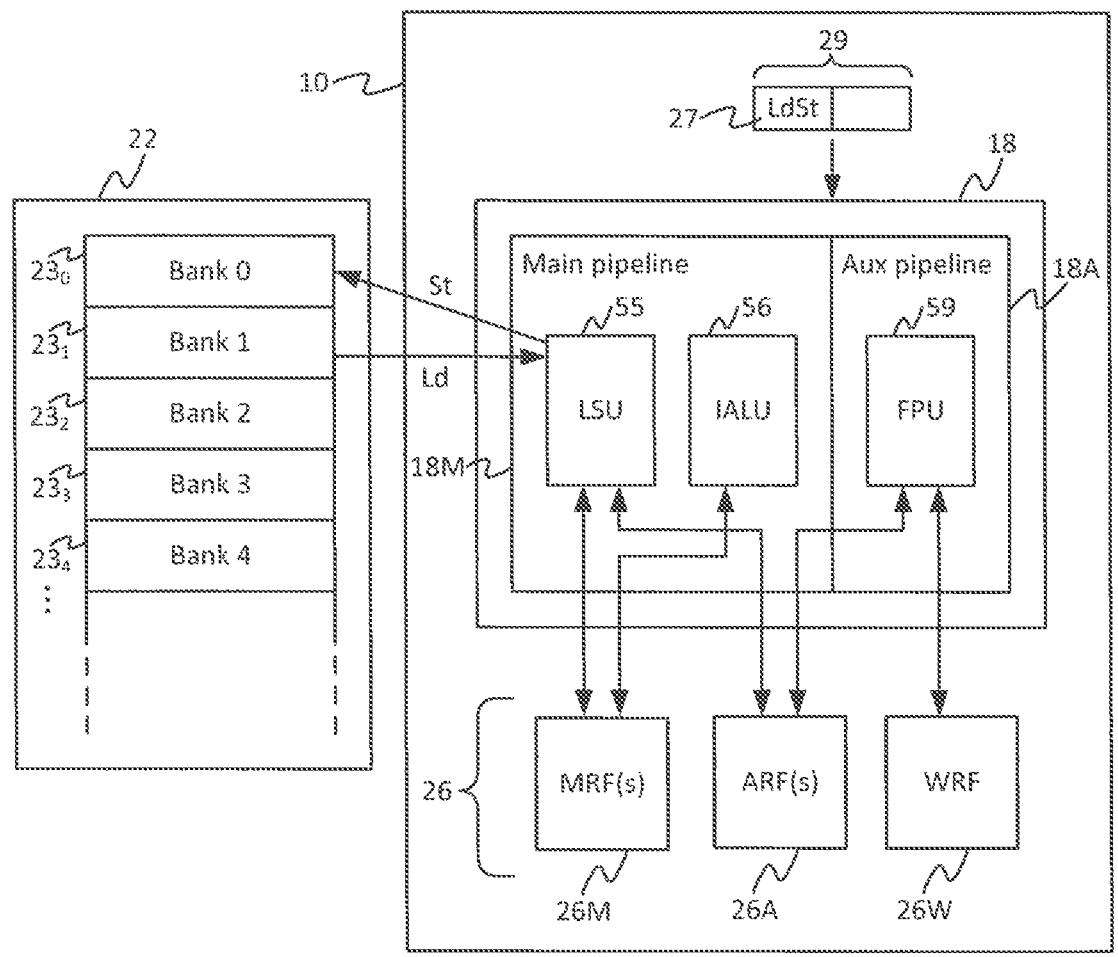
FIG. 3 is a schematic block diagram of a processor module, FIG. 4 schematically illustrates a method of compiling a program, FIG. 5 schematically illustrates a portion of an input graph, FIG. 6 schematically illustrates a vertex of a graph with input and output edges, FIG. 7 schematically illustrates two equivalent graph representations, and FIG. 8 schematically illustrates the concept of interleaved memory, FIG. 9 schematically illustrates the concept of alignment in memory, FIG. 10 schematically illustrates the concept of an overread region in memory.

FIG. 1 shows an example system 100 upon which a compiled program may be executed in accordance with embodiments disclosed herein. The system comprises a plurality of processor modules 4 called tiles. The tiles 4 may be implemented on one or more processor chips 2, with multiple tiles 4 on each chip (i.e. die). FIG. 2 illustrates an example where the tiles 4 span two chips 2I, 2II, but it will be appreciated that this is just one example and the tiles could instead all be implemented on a single chip or spread across more than two chips. Referring also to FIG. 3, each individual tile 4 comprises its own respective processing unit, each processing unit comprising its own respective execution unit 18 for executing machine code instructions. Each individual tile 4 also comprises its own respective memory 22 for storing data and code. Thus the system 100 supports a great deal of parallelism, enabling parallel execution of different respective parts of the overall program on different ones of the tiles 4. For instance, the (or each) chip 2 could comprise 10, 20, 50, 100, 200, 500 or even 1000 tiles. E.g. in example implementations there may be 1216 or 1280 tiles per chip. Further, in embodiments each processing unit may take the form of a multi-threaded processing unit for interleaving multiple concurrent threads through the same pipeline. However this is not essential for the present purposes.

The system 100 also comprises an interconnect 6 comprising hardware logic enabling the different tiles 4 to communicate with one another, in order to exchange data, e.g. so the results of computations performed by one tile 4 can be sent to another. The interconnect 6 comprises at least an internal (on-chip) interconnect on the or each chip 2, for communicating between tiles 4 on the same chip. In embodiments where the tiles 4 span multiple chips 2, the interconnect 6 also comprises an external interconnect for communicating between tiles 4 on different chips 2.

As part of the compilation, different parts of the program are allocated to run on different ones of the tiles 4, and to exchange data with one another in order to operate together to implement the overall program as a whole. For instance the program may comprise a machine learning algorithm comprising a neural network, and different tiles 4 may run parts of the program representing different vertices of the neural network. The different parts of the program, when compiled, are configured to synchronize with one another according to a suitable synchronization scheme such as bulk synchronous parallel (BSP), rendez vous, or the post box approach. Preferably a BSP scheme is used.

It will be appreciated that the arrangements of FIGS. 1 and 2 are given only by way of example. More generally, the system 100 may comprise a single processing module 4 on a single chip, or multiple processor modules 4 on the same chip 2 or spread across multiple chips 2 with one or more processor modules 4 per chip 2.

Either way, FIG. 3 gives a schematic example of the processor module 4. In the case of multiple tiles, each tile may comprise an identical instance of the processor module 4. The processor module 4 comprises a memory 22, and a processing unit 10 comprising an execution unit 18. The processing unit 10 further comprises one or more register files 26, and an instruction fetch stage and instruction decode stage (not shown). The memory 22 is arranged to store data to be operated on by code executed on the execution unit 18, and resulting from operations performed by the code executed by the execution unit. Other regions of the memory 22 are used to store the code itself. The execution unit 18 is arranged to receive and execute instructions 27 fetched from memory by the fetch stage and decoded by the decode stage. Again, instructions herein mean machine code instructions. The execution unit 18 is configured to recognize a certain instruction set defining types of instructions, each instruction type defined by a different respective opcode and comprising a corresponding zero or more operand fields. Each of the instructions 27 issued into the execution unit 18 is an instance of one of these instruction types defined by the instruction set of the execution unit 18.

These instruction types may include memory access instructions (load and store type instructions), and logic instructions (integer arithmetic instructions and floating point instructions). The execution unit 18 comprises a load-store unit (LSU) 55 for executing the instances of the memory access instructions, an integer arithmetic logic unit (IALU) 56 for executing the instances of the integer arithmetic instructions, and a floating point logic unit (FPU) 59 for executing the instances of the floating point instructions. The execution unit 18 comprises hardware logic configured to be triggered by the opcode of each instruction to perform the corresponding operation associated with the type of the executed instruction.

Each memory access instruction, when executed, triggers the load-store unit (LSU) 55 to perform at least one load operation or one store operation, depending on the particular type of memory access instruction. A load operation comprises loading data from a source address in the memory 22 into at least one of the registers in one of the register files 26. The source memory address and register location are specified by operands of the instruction. In embodiments the source memory address is specified by means of a pointer (i.e. the operand of the instruction identifies a register in one of the register files 26 in which the source memory address is held, rather than specifying the memory address directly). A store operation comprises storing data from at least one of the registers in one of the register files 26 into a destination address in the memory 22. The destination memory address and register location are specified by operands of the instruction. In embodiments the destination memory address is specified by means of a pointer (i.e. the operand of the instruction identifies a register in one of the register files 26 in which the destination memory address is held).

Logic instructions such as floating point and integer arithmetic instructions trigger the floating point unit (FPU) 59 or integer logic unit (IALU) 56, respectively, to perform a type of mathematical operation mapped to the opcode. The operands of the instruction may take one or more source operands specifying a source register or registers from which to take values to be operated upon, and one or more destination operands specifying a destination register or registers into which to place the result or results of the operations performed by the instruction. For example, a simple add instruction typically takes at least three operands: two sources and a destination. When executed, it causes the execution unit 18 to take the values in the two source registers, add them, and place the resulting sum in the destination register. Similar logic applies for e.g. simple subtract, multiply and divide instructions. Various other types of logic instruction may also be included in the instruction set, e.g. vector multiplication, matrix multiplication and convolution instructions.

Thus the code run on the processing module can be used to load data from memory 22 into the register files 26, perform operations on the data in the register files, and store the results back to memory 22.

The instructions are executed over a sequence of instruction issue cycles. In each instruction issue cycle, the fetch stage issues at least one instruction 27 into the execution unit 18 for execution. In embodiments the execution unit 18 may be pipelined. Further, in some embodiments, the execution unit may comprise a plurality of parallel pipelines. For instance in embodiments the execution unit 18 is divided into a main pipeline 18M comprising the load-store unit (LSU) 55 and integer arithmetic unit (IALU) 56, and an auxiliary pipeline 18A comprising the floating point unit (FPU) 59. In this case, the register files 26 comprise at least one main register file 26M and at least one auxiliary register file 26A, corresponding to the main pipeline 18M and auxiliary pipeline 26A respectively. When the main pipeline 18M executes an instruction specifying one or more registers in its operand(s), then the relevant unit 55, 56 in the main pipeline 18M implicitly interprets the specified register location as a location in the main register file 26M. When the auxiliary pipeline 18A executes an instruction specifying one or more registers in its operands, the FPU 59 implicitly treats the specified register location as a location within the auxiliary register file 26A. It will be appreciated that "main" and "auxiliary" are just names and they could equally be called the first and second pipelines and register files respectively. In some particular embodiments the register files 26 may also include a weights register file (WRF) 26W comprising registers which are implicitly used by certain types of floating point instruction such as a convolution instruction.

In some embodiments the processing unit is able to issue a small instruction word or "bundle" 29 of instructions into the execution unit 18 for execution per instruction cycle. This enables the instructions of the bundle 29 to be executed in parallel. For instance in embodiments the bundle size is two. One of the instructions 27 is a memory access instruction or integer logic instruction and is executed by the main pipeline 18M, whilst the other instruction in the bundle 29 is a floating point instruction and is executed by the auxiliary pipeline 18A. In general either or both of these two halves of the bundle 29 may be populated in any given instruction cycle.

In embodiments the processing unit 10 may be a multi-threaded processing unit, also called a barrel-threaded processing unit. This means that the fetch stage is configured to fetch instructions from different program threads and temporally interleave them through the execution unit 18 in different time slots, typically according to a round robin or weighted round robin schedule. Each time slot comprises at least one instruction issue cycle. In embodiments each time slot may comprise only a single instruction issue cycle, so each thread gets one instruction 27 or instruction bundle 29 issued into the execution unit 18 per round of the round robin schedule. In embodiments employing multi-threading, the register files 26 comprise a separate one or more register files per thread (sometimes called the context registers of the thread). These execution unit 18 is configured so as, when executing an instruction from the time slot of a given thread, to implicitly interpret any register location(s) specified by the operand(s) of that instruction as a location in the register file of the respective thread. In embodiments each slot has its own respective MRF 26M and ARF 26A. In embodiments the WRF 26W may be common to all slots.

However it will be appreciated that these are just examples. More generally the execution unit 18 could comprise a single pipeline or need not even be pipelined, and the processing unit 10 could be multi-threaded or configured to execute only a single program thread.

Figure 4:
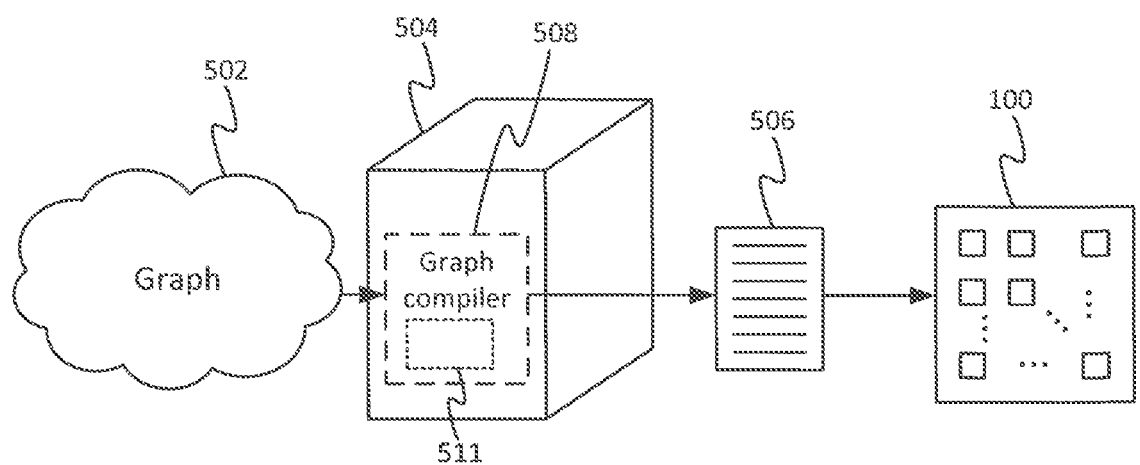

FIG. 4 illustrates an apparatus for compiling a high-level, graph-based program into a low-level machine code program in order to run on a processing system 100, such as that described in relation to FIGS. 1, 2 and/or 3.

The apparatus comprises a computer 504, which could take the form of a server comprising one or more server units at one or more geographical sites, or one or more user terminals such as a desktop computer, or a combination of a server and one or more user terminals. The computer 504 is arranged to run a compiler 508, taking the form of software stored on computer-readable storage of the computer 504 (e.g. one or more internal and/or external magnetic disk drives and/or EEPROMs) and arranged to run on one or more processors of the computer 504 (e.g. one or more CPUs). The compiler 508, when run on the computer 504, is arranged to receive an input graph 502, and to compile the input graph 502 in order to generate an executable program 506 which can then be run on a multi-tile processing system 100 such as that described in relation to any of FIGS. 1, 2 and/or 3.

Figure 5:
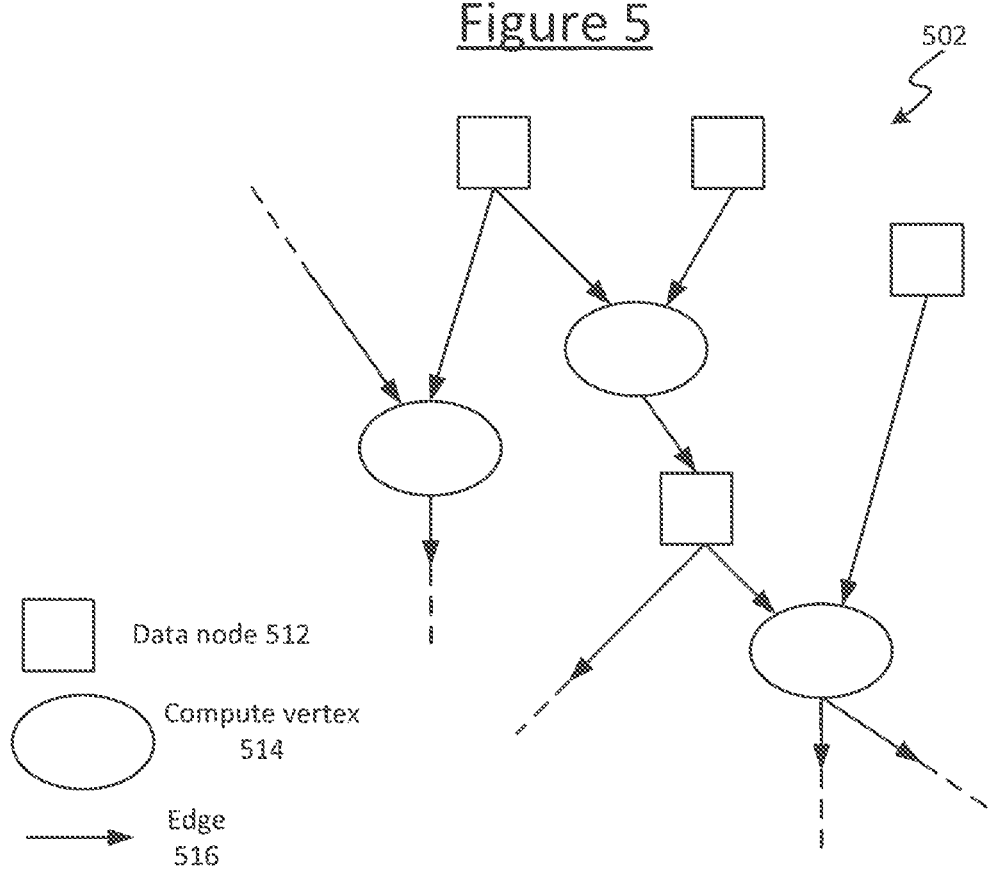

An example of an input graph is shown in FIG. 5. The input graph 502 comprises a plurality of data nodes 512, a plurality of compute vertices 514, and a plurality of directional edges 516 each connecting between a respective pair of data node and vertex.

Each data node 512 represents a data element, meaning herein a variable. Note that in the context of computing or computer science, the term "variable" does not necessarily imply that the value of the variable has to change during runtime: it could vary or remain constant (i.e. a constant may be considered a type of variable in the sense of computing). This is the sense in which the term "variable" is used herein. To avoid confusion with other contexts, the term "data element" may be also adopted. Note also that a data element or variable as referred to herein refers to a numerical data object or construct abstracted from the particular value of that object at any one moment in time. For instance the variable or data element could be a numerical object labelled Var1 in the high-level language, that could happen to take a constant value or whose value could vary one or more times during the running of the compiled program.

Each edge 516 represents an output from a compute vertex 514 to a data node 512 or vice versa. Each compute vertex 514 (i.e. compute node) represents one or more computations to be performed on one or more inputs received on the edge(s) output from one or more data nodes 512, the result(s) of which is/are output to one or more data nodes 512 (typically one or more other data nodes) on the output edge(s) from the respective compute vertex 514. It will be appreciated that the particular graph topology shown in FIG. 5 is just by way of example, and in practice the graph 502 will also tend to comprise many more nodes 512, edges 516 and vertices 514, in potentially more complex configurations. FIG. 5 may be considered to show an example fragment of a graph for illustrative purposes. Note also that while the input graph 502 is illustrated schematically as originating externally to the computer 504, which is one possibility, it could also originate from within the same computer 504 (e.g. having been authored and/or stored thereon using a suitable authoring tool, not shown).

The input graph 502 may be designed by a human developer to implement the data flows and computations the developer wishes (the "developer" here could be one person or a team). For instance the graph 502 may comprise a tensor flow as part of a neural network. Note that in the case where the graph 502 implements a neural network, then each node or "neurone" of the neural network may comprise one or more compute vertices 514 and one or more data nodes 512 of the graph 502 (i.e. of the programmatic structure of the program). I.e. the topography of the neural network may be described at a higher level of abstraction than the graph 502 of the program. The present disclosure is primarily concerned with the latter.

Figure 6:
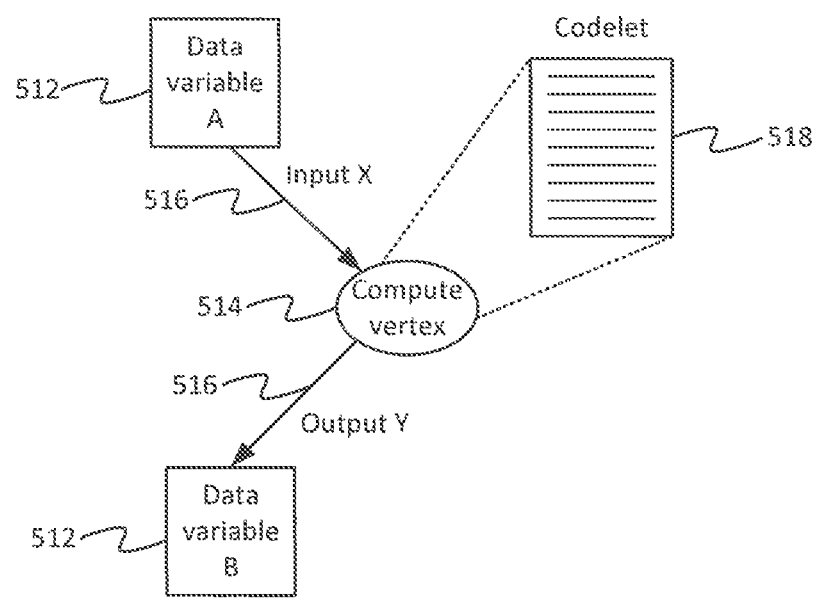

FIG. 6 illustrates an example of a particular compute vertex 415 having an input X from a data node 512 representing a first variable A, and an output Y to a second data node 512 representing a second variable B. As also illustrated, the vertex 518 may comprise one or more codelets 518. A codelet is a particular type of thread, sometimes also referred to as an "atomic" thread. It has all the input information it needs to execute from the beginning of the thread (from the time of being launched), i.e. it does not take any input from any other part of the program or from memory after being launched. Further, no other part of the program will use any outputs (results) of the thread until it has terminated (finishes). Unless it encounters an error, it is guaranteed to finish. Some literature also defines a codelet as being stateless, i.e. if run twice it could not inherit any information from its first run, but that additional definition is not necessarily adopted here. Codelets are a convenient way to divide the graph 502 which makes the vertices 514 more readily separable amongst different threads, tiles 4 and/or chips 2 when lowered by the compiler 508. In embodiments each vertex 514 may be formed only from codelets. However this is not essential in all embodiments and more generally the vertices 518 may represent any portions of code.

Figure 7:
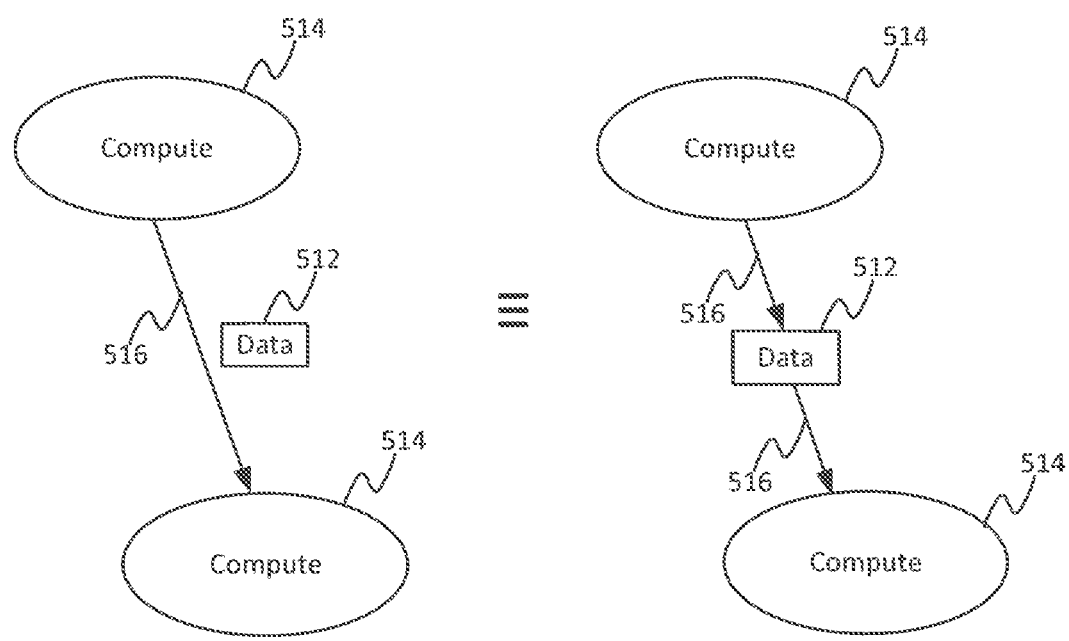

Note also, in some representations the same graph 502 may equivalently be represented by compute nodes (vertices) that are connected to each other with edges and the data elements (variables) are indicated as annotations on the edges, rather than explicitly as data nodes 512. This is shown in the left hand side of FIG. 7. Either representation may equivalently be used. It will be appreciated that annotations of data on edges are a schematically equivalent way of describing data nodes, and the way they are presented to the human developer in any given view in any given tool does not exclude the fact that, in substance, items of data that can be called data nodes are still present in the underlying computational structure of the graph and can still read onto the data nodes 512 disclosed herein. Put another way, a representation of an edge annotated by data is a condensed way of representing a data node with an input edge from one compute vertex and an output edge to the another vertex (see FIG. 7). The latter representation is adopted herein by way of explanation of the concepts, but it will be appreciated that in substance, a graph as claimed herein refers to the underlying computational graph and not the conceptual or graphical manner in which it is presented to a human. I.e. the graph 502 refers to the underlying data structure comprising functions and flows of data through functions; wherein the functions can be referred to as compute vertices 514 and the data input to or from such functions can be referred to as the data nodes 512, with any logical flow of data into or out of the functions/vertices being referred to as edges.

Returning to FIG. 3, the memory 22 comprises a plurality of separate memory banks 23 implemented over one or more physical areas of the chip 2. E.g. in embodiments each bank 23 is 16 kB in size. The different memory banks 23 are physically separate memory elements, at least in that they have independently accessible interfaces with the load-store unit (LSU) 55. This means the LSU 55 can access two different memory banks 23 at once, in the same instruction cycle if required. However, a given memory bank 23 can only be accessed once, in order to perform only a single load operation or a single store operation (but not both) in a single instruction cycle. This is an architectural constraint (i.e. physical constraint) due to the architecture of the memory 22. Note: the term "memory bank" as used herein is used in its generic sense, and does not imply any further limitations that may be associated with the term as adopted in association with any particular proprietary processor or memory architecture. The term could equally be replaced with the term "memory element" anywhere herein.

The types of memory access instruction defined in the instruction set may comprise one or more types of multi-access instructions. This is a type of instruction that performs more than one load operation, or more than one store operation, or at least one load and one store operation, in the same instruction. Examples may include any one or more of: a load-store ("LdSt") type instruction which performs a single load and a single store operation in a single instruction; a double load instruction ("Ldx2") which performs exactly two load operations in a single instruction; a double store instruction ("Stx2") which performs exactly two store operations in a single instruction; and/or a double load, single store (load-load-store, or "Ldx2St") instruction which performs exactly two load operations and one store operation in a single instruction; etc.

When the compiler 508 compiles the graph 502, lowering it to run on the execution unit(s) of the processor module(s) 4, then the low-level implementation of the input edges 516 may comprise load operations performed by load type instructions (e.g. load instructions, load-store instructions, etc.) and the low-level implementation of output edges 516 may comprise store operations performed by store type instructions (e.g. store instructions, load-store instructions, etc.).

However, the above-mentioned architectural constraint on the memory 22—i.e. the fact that two banks 23 cannot be subject to two memory access operations at the same time—has the potential to conflict with the use of multi-access instructions. Therefore in accordance with embodiments of the present disclosure, the compiler 508 comprises a constraint-solver 511 which is configured to apply one or more constraints when compiling the graph 502. These one or more constraints comprise at least the constraint that: the same multi-access instruction must not attempt to perform both a load and a store, nor two loads, nor two stores (nor any more than this) to the same memory bank 23 at the same time. In embodiments, optionally, one or more additional constraints may also be applied by the constraint solver 511.

Constraints are required to support the different load/store instructions which require placement of data in certain sets of memory elements. Not using correct placement would mean that either a specific set of instructions cannot be used, or the processor 10 throws a memory error exception.

Constraints are ultimately constraints on the allocation of data elements (variables) to addresses in memory. However, constraints may be associated with edges 516 inputting or outputting the values of the data elements at any given point in the program. Hence the constrain solver 511 may need to process the constraints associated with any edge or edges 516 that input or output to/from the node 512 representing a given data element anywhere in the graph 502.

Constraints may be either relational or non-relational. A relational constrain herein means a constraint involving at least two edges where one edge would have the potential to interfere with the other edge if the constraint is not applied. In contrast a non-relational constraint is a constraint that applies individually to a given edge. According to the present disclosure, the constraints comprise at least one relational constraint, namely that two edges cannot access the same memory bank at the same time. The constraints may optionally comprise one or more non-relational constraints, e.g. relating to the alignment of the data pointed to by a given edge, or the type of memory in which it is stored.

Constraint support may be added in the high level source language using specific extensions. The following illustrates constraints A-D which may be applied by the constraint solver 511, along with some an exemplary extensions which may be used to specify the constraints in the high level language.

A. poplar::constraint("elem(in) !=elem(out)").

This puts a constraint that two-directional edges in and out of a vertex 514 must not be in the same memory element 23. This allows multi-load/store instructions to be used. The '**' symbol gives the indirection level of the edges. This is an example of a relational constraint as it describes a constraint between edges.

B. Output<int, 8, true> out

This specification puts a constraint that the output edge 516 must be placed in a certain sub-set of memory elements 23, e.g. interleaved memory. This is an example of a non-relational constraint. In embodiments it is a binary selection between specifying interleaved memory or allowing any type of memory, and the parameter 'true' in the example extension format indicates that the constraint of requiring aligned memory is asserted. However other embodiments could allow a wider or different selection between other types of memory.

C. Output<int, 8, false>

Edges 516 are by default aligned to the natural alignment of the data type. It is however possible to specify additional alignment constraints. This may be done because it allows use of certain load/store instructions. This is an example of a non-relational constrain. In the example extension format shown, the '8' specifies 8-byte memory alignment.

D. Output<int, 8, false, 4> in

This specification puts a constraint that the data from edge in would be over-read by a certain amount—at the maximum by 4 in this example (specified by the '4' in the example extension format shown). This is required in certain pipelined implementations of functions. Code bloat is the result if flexibility of over-reading is not available (see below). Constraint D is another example of a non-relational constraint.

Any one or more of the constraints A-D, or variants thereof, may be imposed depending on embodiment.

Constraint A is an example of the constraint mentioned previously: the same load-store instruction—implementing an input and an output edge of a vertex 514 respectively—should not attempt to load and store to/from the same memory bank 23 at once. So referring to FIG. 6, input edge X loading variable A should come from a different memory bank 23 than output edge Y storing variable B. Another example of such a constraint is that a double-load instruction, implementing two input edges 516, should not attempt to load from the same memory bank 23 at the same time. Another example is that for a given load-load-store instruction, all three of the two loads and one store should access three different respective banks 23.

Constraint B says that the store operation performed by a given store type instruction (e.g. store instruction or load-store instruction), implementing an input edge 516, should store to one or more of a specific subset of memory banks 23. This subset may be specified as a parameter of the constraint in the high-level program, e.g. using the above format or any other suitable extension or specifier in any suitable high-level language. In embodiments the specified subset may be a specific kind of memory, such as interleaved memory. The concept of interleaved memory, in itself, is understood in the art, but is explained briefly herein with reference to FIG. 8. As shown, a region of interleaved memory comprises a plurality of memory banks 23—four in the illustrated example, but in general it could be any number N from two upwards. The memory address space spanning the interleaved memory region is spread across that region, increasing contiguously from one bank to the next. So a first memory address is mapped to a corresponding part in a first bank $23_0$, then a next contiguous memory address is mapped to the next bank $23_1$, and so forth. In general, memory address i is mapped to bank n=i mod N. The advantage is that this hides some of the latency incurred in accessing the memory banks 23. I.e. if a given operation needs to load from or store to a range of two or more contiguous addresses (e.g. it is loading or storing two or more bytes or words), it does need to wait for the access of one address from one of the banks 23 to be completed before accessing the next contiguous address in the range.

In embodiments the constraint-solver 511 enables only a binary selection between either, on the one hand, requiring the variable pointed to by the edge to be allocated to interleaved memory, or on the other hand, allowing it to be allocated to any memory (e.g. see the "true" and "false" values of the parameter in the above example extension formats). However this is not limiting. In other embodiments, the scheme recognized by the constraint solver 511 may alternatively or additionally allow for one or more other types of memory to be specified as a constraint on where the variable of an edge can be allocated. For instance, the specified subset of memory banks could be banks of a memory unit or region with a faster memory access speed than other memory units or regions on the tile 4, or with a certain port width or number of ports (e.g. required for certain dual access instructions). For example, the extension format may support a binary parameter selecting between specifying the fast memory or allowing any memory; or may support a non-binary parameter selecting between a constraint of interleaved memory, a constraint of fast memory, a constraint of both fast and interleaved memory, or no constraint on type of memory.

Constraint C says that the store operation performed by a given store type instruction (e.g. store instruction or load-store instruction), implementing an input edge 516, should store to memory 22 with a certain specified alignment. This alignment may be specified as a parameter of the constraint in the high-level program, e.g. using the above format or any other suitable extension or specifier in any suitable high-level language. The concept of memory alignment, in itself, is understood in the art, but is explained briefly herein with reference to FIG. 9. Memory 22 in general may be byte addressable or word addressable. FIG. 9 illustrates the example of a byte addressable memory where each memory address in memory address space is mapped to an individual respective byte of storage 21, but it could equally be word addressable wherein each memory address is mapped to a respective word of two or more bytes. The alignment refers to how items of data 25 stored into the memory 22 are aligned with these fundamental units of address space. For instance, FIG. 9 shows an example where the stored items are individual bytes $25_b$, and these are byte aligned with the byte units 21 of storage in the memory 22. FIG. 9 shows another example where the stored items are two-byte words $25_{2b}$, each 2-byte word aligned with a respective 2-byte portion of storage in the memory 22, with the words $25_{2b}$ being stored at integer multiples of the 2-byte word size. FIG. 9 also shows another example where the stored items are four-byte words $25_{4b}$, each 2-byte word aligned with a respective 4-byte portion of storage in the memory 22, with the words $25_{4b}$ being stored at integer multiples of the 4-byte word size. It will be appreciated that these are just examples and other word sizes and corresponding word alignments are possible.

The LSU 55 is preferably configured so stored items of data are naturally aligned, i.e. by default they are stored as shown by way of example in FIG. 9, with each byte or word of data 25 aligned with a corresponding portion of the address space that is an integer multiple of the word size. However, in embodiments the high-level language enables a different alignment to be specified for the store operation associated with a given output edge 516. For example, a memory unit may have a port width of 8 bytes (64 bits). However the variable pointed to by a given edge may have a width of 4 bytes (32 bits). Some memory architecture do not allow storing to or loading from an portion of memory that is not aligned, and this would cause a runtime error if a constraint was not applied requiring the data of the 4-byte variable to be 8-byte aligned in memory. This forces the start of the data to be aligned with the start of an 8-byte portion of memory. This in itself is a known problem and various languages allow one to specify a memory alignment. Nonetheless, this may need to be taken into account in the constraint solver 511 along with the other constraints disclosed herein (depending on the data and the memory architecture of the memory unit or region to which the data is being allocated).

Constraint D relates to the concept of memory "over read" or leaving an "overspill" region. It enables the high level language to specify a certain over-read or overspill region associated with a load or store operation implementing an edge 516. The idea is illustrated by way of example in FIG. 10. The usefulness of an overspill region arises when the program comprising a loop containing a load or store operation. For instance consider a looped pair of instructions of the form (in pseudocode):

```
Loop m++ {
    load m, $r; process $r;
}
``` where "load" represents any kind of load type instruction, e.g. a plain load instruction, a load-store instruction or a load-load-store instruction, which loads from address m and places the value in register $r; and "process" represents any logic instruction which operates on the value in register $r. Any other operands are not shown for conciseness. E.g. this could be a pair of instructions executed in parallel in a two instruction bundle, with the load type instruction being executed by the main pipeline 18M and the logic instruction being a floating point instruction executed by the auxiliary pipeline 18A.

With each loop, the load type instruction loads a value from a memory location m (labelled 27 in FIG. 10) whilst the logic instruction is processing the value in $r loaded by the load in the previous repetition of the loop. This means in the last repetition of the loop, the load instruction will load from a memory location that is never used. This is the "overspill" or "over-read" region. One could instead write a special additional portion of code to handle the last load & logic instruction pair in the sequence, but this is less convenient and wasteful in terms of code density (hence leading to the aforementioned code bloat). Instead it is often more convenient simply to leave a memory location reserved for this last piece of unused loaded data. Over-reads could also lead to bank conflict if this region was not specifically reserved.

FIG. 10 shows a simple example of only four loop repetitions for illustrative purposes. The last location—the overspill region—is location 27(3) in the example in this example. The constraint added in the high level language tells the constraint solver 511 in the compiler 508 to leave an overspill region for the last, unused load in the loop.

As part of compilation of a high level graph 502, the compiler 508 lowers the graph, e.g. to individual tiles 4 on the processor(s) 2. Individual tiles 4 have variables allocated for edges 516 described in the high level graph. Each variable is allocated a contiguous portion of memory space within the memory 22, which may be one or more contiguous bytes of memory (i.e. a given variable cannot be allocated to non-contiguous portions of memory). Note also that a reference to a variable anywhere does not exclude the option of a constant. The term "data element" could be used to replace the term "variable" anywhere herein.

Figure 11:
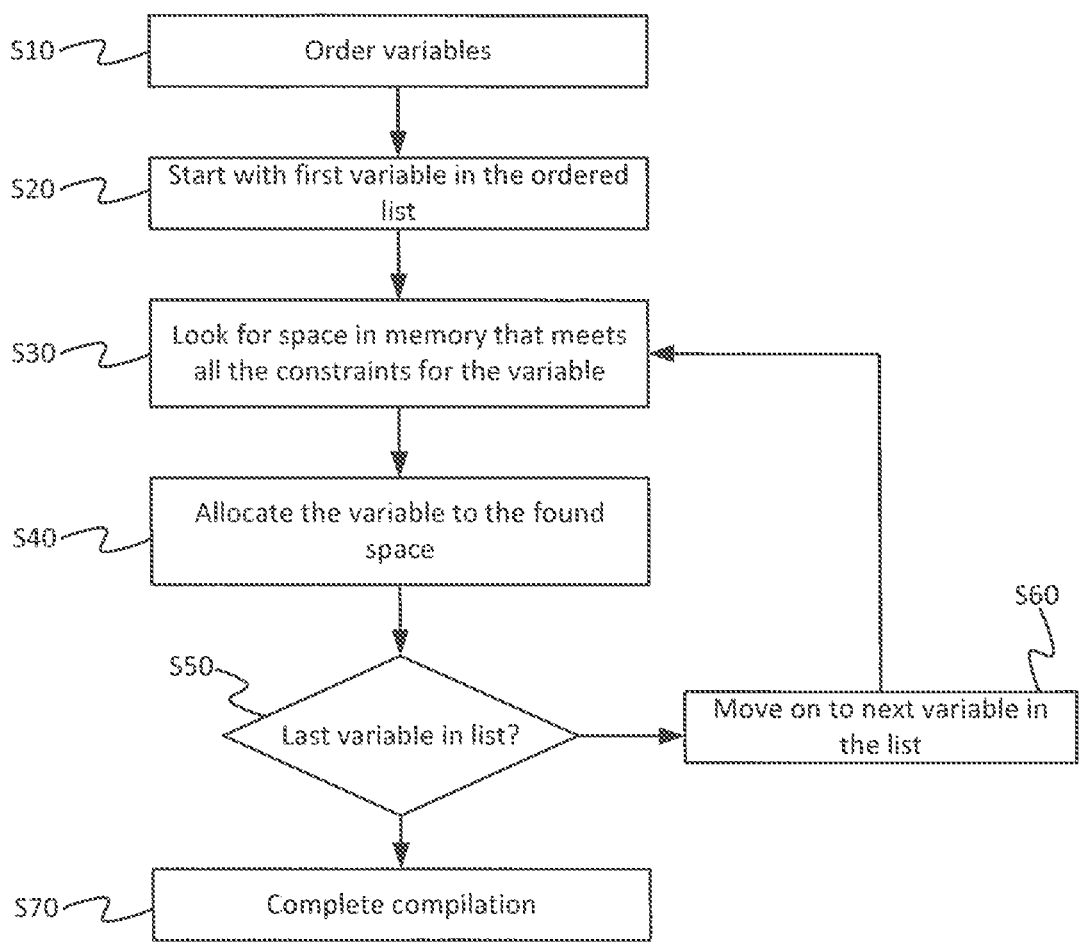
FIG. 11 is a schematic flow chart of a constraint solver process.

FIG. 11 shows a flow chart of an example method that may be performed by the constraint solver 511 to resolve the constraints for the different variables corresponding to edges 512, and allocate them to respective regions in the memory 22. In short, the method comprises stepping through a list of all the variables in order, and with each variable, allocating it to a part of memory where it will not conflict with any previously allocated variables in the list.

At step S10, the method comprises assigning an order to the variables represented by the different data nodes 512. Any order can be used. In embodiments a specific order may be used as an optimization in order to improve the speed of the process. However the method will still work regardless of what order is used, it will just be slower than if one of the optimizations is used. E.g. the order could be random instead. Whatever order is selected, step S10 thus results in an ordered list of the variables awaiting allocation.

At step S20 the method comprises selecting the first variable in the list to begin the allocation for. At step S30 the method comprises finding a space in memory 22 for the current variable under consideration, which at this point (the first iteration) is the first variable in the list. For the first variable there are no possible conflicts with other variables since none others have been allocated yet, so the method at this stage just comprises choosing a region of memory for the variable that meets any non-relational constraints, e.g. selecting an address range in the specified type of memory (e.g. interleaved memory). At step S40 the method comprises allocating the current variable under consideration to the selected region in the memory 22.

At step S50 the method comprises determining whether the variable allocated at step S40 was the last in the list. If not, the method looks back to step S30, to look for a region of memory 22 for allocating the next variable in the order list. This now needs to take into account not only any non-relational constraints, but also any relational constraints. This will comprise at least the relational constraint that the data of two variables cannot be loaded from or stored to the same memory bank 23 at the same time. In embodiments, this may be implemented as a constraint that variables cannot be allocated to the same bank if their data will be "live" for at least some of the same time, i.e. for overlapping time periods. Where it is said herein that a variable will be "live", this refers to the time, during runtime, between the data of the variable being written to memory 22 and it being used by the program. To asses this constraint, the constraint solver 511 may perform a "liveness" analysis, to determine which variables will be live for what times after the program is compiled and run, and which variables will be live at overlapping times. If two variables would be live at overlapping times then they may be said to conflict or interfere with one another (in the sense that, if the compiler 508 tried to allocate them to the same memory bank 23, then the access logic of the memory bank 23 could not service them both at the same time).

Hence at step S30, for each but the first variable in the ordered list, the method comprises finding a region of memory 22 for the variable that does not conflict (interfere) with any other variable allocated so far (any other preceding variable in the ordered list). I.e. it finds an address range in a memory bank 23 not shared with any other variables allocated so far that would be live for at least some of the same time. Put another way, the current variable in the list is allocated to a remaining address space in the memory 22 (as yet unallocated) that does not fall within the same bank 23 any other conflicted, already-allocated variable. At step S40 the method comprises allocating the current variable in the list to the selected region in the memory 22.

If at step S50 it is determined that the last variable in the list has been allocated, the method proceeds to step S70 where it completes the compilation. This comprises generating an executable program in which the allocated memory address spaces are used to store the data of each variable respectively, and from which that data will be loaded when needed during runtime (and potentially stored back to if required). The compilation may of course involve other conventional compilation steps that will be familiar to a person skilled in the art.

As mentioned, in embodiments the ordered list determined in step S10 may simply be in any order. However, in preferred embodiments, a specific order is selected to try to optimize the speed of the constraint solving process. This optimization may comprise any one, more or all of a number of techniques.

In embodiments step S10 may comprise ordering the variables according to a certain metric or metrics. For instance, one way to order the variables is by size (i.e. amount of space occupied in memory), with larger size variables at the top of the list and smaller size variables lower down. This means larger variables get allocated first, and smaller ones later. This tends to be faster and improve packing, because there is more opportunity to slot in smaller variables around large ones, than if the allocation was done the other way round. For analogous reasons, another way to order the variables is by amount of time they will be live, with the longer lived variables being placed at the top of the list and therefore being allocated first, and the less long-lived variables being further down the list and allocated after the longer lived variables. Another example metric for ordering the variables is by the size of the program line range for which they will be live, again for similar reasons (starting by allocating longest lived variables first, then slotting in shorter lived variables around them).

In embodiments a combination of two or more of these metrics and/or other metrics could be used to order the variables; e.g. first ordering by size and then ordering any variables of the same size by liveness time, or vice versa.

Alternatively or additionally to the above, the ordering at step S10 may comprise grouping the variables into "equivalence classes". Each equivalence class is a set of variables which each interfere with some or all of the same other variables. E.g. if variables A and B both interfere with variables D, C and E, then A and B may be placed in one equivalence class whilst D, C and E may be placed in another equivalence class (N.B. just because A and B overlap in time C, does not necessarily mean A and B overlap with one another). In a structured program there tend to be groups of variables that interfere with the same other variables. In embodiments, the ordering may comprise ordering the equivalence classes according to a metric such as the number of variables in the class (largest classes first), total size of the class in bytes (largest classes first), total live time spanned by the class (longest lived classes first), etc. The advantage of grouping into equivalence classes is that it reduces the processing time of the constraint solver process, because it means the constraint solver 511 does not have to re-compute the interference information each time it allocates each individual variable within the class.

In embodiments the variables may also be ordered within the equivalence classes, e.g. again according to a metric such as variable size or liveness time. Thus the variables may be ordered first by class, the by one or more metrics within each class.

In embodiments, a variable constraint builder in the constraint solver 511 builds pair-wise constraints with the types of relational constraint imposed. Non-relational constraint information is also extracted from the high level constraint description by the constraint builder.

Liveness analysis of the graph groups variables which are affected similarly into equivalence classes. This reduces the burden of keeping liveness information for each variable separately. Liveness analyses also build a table of which equivalence classes can and cannot interfere with each other (i.e. which variables are live and not live at the same time). This information along with the constraints information of variables is used by the memory allocator.

In embodiments, the following steps are followed by a memory allocator function in the constraint solver 511:
  i. Order the equivalence classes according to some metric. Common metrics used are the size of the total variables in an equivalence class, or the number of classes it interferes with.
  ii. Order variables within each equivalence class according to some metric. Common metrics used are size and alignment.
  iii. Ordering of variable allocation is done as per the ordering of equivalence classes determined by step i and step ii.
  iv. For each variable v in an ordered equivalence class, find space in memory such that all constraints on the variable are met, and doesn't clash with any variables already allocated for equivalence classes interfering with the class to which v belongs. The constraints on the variable include all the relational and non-relational constraints. For relational constraints this means if v has a relational constraint with v1, and v1 is already allocated, the relational constraint must be met along with non-relational constraint. If no variable with which v shares a relational constraint is allocated, then only non-relational constraints are met.

It will be appreciated that the above embodiments have been described by way of example only. Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method for generating an executable program to run on a system of one or more processor chips each comprising one or more processor modules, each processor module comprising an execution unit and memory; the method comprising:

receiving a graph comprising a plurality of data nodes, a plurality of compute vertices and a plurality of directional edges, each data node representing a data element, each edge representing an input to a compute vertex from a data node or an output from a compute vertex input to a data node or another compute vertex, and each compute vertex representing one or more computations to perform on its input or inputs in order to produce the output or outputs from that compute vertex;

compiling the graph into said executable program, the executable program comprising a plurality of machine code instructions, including one or more types of multi-access instruction each of which performs at least two load operations, at least two store operations, or at least one load and one store operation in a single instruction;

wherein the memory on each of the processor modules comprises a respective plurality of memory banks; and the compilation comprises assigning instances of said multi-access instructions to implement at least some of said edges, analyzing the graph, and in dependence upon a result of analyzing the graph, allocating the data elements to memory addresses within different ones of the banks, wherein the allocating applies one or more constraints including at least a first constraint that no two edges can access the same memory bank at the same time;

wherein allocating the data elements comprises:
grouping the data elements into equivalence classes, wherein a first equivalence class includes a first set of the data elements that interfere with a second set of other ones of the data elements of a second equivalence class;

generating ordered equivalence classes at least in part by ordering the equivalence classes according to a metric; and stepping through the data elements within the ordered equivalence classes to allocate each of the data elements in turn, wherein the metric comprises a first metric, the method further comprising: ordering the data elements within each equivalence class according to a second metric that is different from the first metric; and for each equivalence class, stepping through the ordered data elements within a respective equivalence class to allocate each of the data elements in turn.

2. The method of claim 1, wherein the constraints further comprise an additional constraint on each of one or more of the edges outputting from a compute vertex, specifying that the data output by the edge should be stored with a specified alignment with respect to the memory addresses.

3. The method of claim 1, wherein the constraints further comprise an additional constraint on each of one or more of the edges outputting from a compute vertex, specifying that the data output by the edge should be stored in a specified subset of the memory banks.

4. The method of claim 3, wherein the specified subset comprises a region of interleaved memory.

5. The method of claim 1, wherein at least one of the vertices comprises a loop, and the constraints further comprise an additional constraint on at least one of the edges outputting from the loop, specifying that an overspill region is left beyond an end of the memory addresses in which the data output by the edge is to be stored.

6. The method of claim 1, wherein the multi-access instructions include at least a load-store instruction which performs a load operation and a store operation in the same instruction.

7. The method of claim 1, wherein the multi-access instructions include at least a double-load instruction which performs two load operations in the same instruction.

8. The method of claim 1, wherein the multi-access instructions include at least a load-load-store instruction which performs two load operations and a store operation in a single instruction.

9. The method of claim 1, wherein the metric comprises one or more items selected from a list consisting of: a total data size of each of the equivalence classes, a number of data elements in each of the equivalence classes, a time for which each of the equivalence classes will be live, and a total number of lines of machine code for which each of the equivalence classes will be live.

10. The method of claim 1, wherein analyzing the graph comprises determining which of the data elements will conflict with one another when the executable program is run; and wherein satisfying the first constraint includes allocating the data elements to memory such that any of the data elements that are determined by analyzing the graph to conflict with one another are allocated to different ones of the memory banks.

11. The method of claim 1, wherein analyzing the graph comprises determining from the graph which of the data elements will be live at the same time when the executable program is run, wherein each data element is live between being written to memory and being used by the program; and wherein satisfying the first constraint includes allocating the data elements to memory such that any of the data elements that are determined by the analysis of the graph to be live at the same time when the executable program is run are allocated to different ones of the memory banks.

12. The method of claim 1, wherein the first metric comprises variable size, and wherein the second metric comprises liveness time.

13. The method of claim 1, wherein the first metric comprises liveness time, and wherein the second metric comprises variable size.

14. A non-transitory machine readable medium having stored thereon instructions for performing a method comprising machine executable code which when executed by at least one computer, causes the computer to:

compile a graph into an executable program having machine code instructions, wherein the graph comprises a plurality of data nodes representing data elements, a plurality of compute vertices and a plurality of directional edges, further wherein the executable program has a multi-access instruction performing at least one item selected from the list consisting of: a plurality of load operations, a plurality of store operations, and a load and a store operation;

wherein the machine executable code for compiling the graph causes the computer to:
assign instances of the multi-access instructions to implement the edges, and
analyze the graph, and in dependence upon a result of analyzing the graph, allocate the data elements to memory addresses within different memory banks, wherein allocating the data elements applies a first constraint that no two edges can access a same memory bank at a same time;

wherein allocating the data elements comprises:
grouping the data elements into equivalence classes, wherein a first equivalence class includes a first set of the data elements that interfere with a second set of other ones of the data elements of a second equivalence class;
generating ordered equivalence classes at least in part by ordering the equivalence classes according to a metric; and
stepping through the data elements within the ordered equivalence classes to allocate each of the data elements in turn, wherein the metric comprises a first metric, and wherein the machine executable code further causes the computer to:
order the data elements within each equivalence class according to a second metric that is different from the first metric; and for each equivalence class, step through the ordered data elements within the ordered equivalence classes, to allocate each of the data elements in turn.

15. The non-transitory machine readable medium of claim 14, wherein the machine executable code for allocating the data elements is subject to a further constraint on each of the edges outputting from a compute vertex, specifying that data output by the respective edge should be stored with a specified alignment with respect to the memory addresses.

16. The non-transitory machine readable medium of claim 14, wherein the machine executable code for allocating the data elements is subject to a further constraint on each of the edges outputting from a compute vertex, specifying that data output by the respective edge should be stored in a specified subset of a plurality of memory banks.

17. The non-transitory machine readable medium of claim 14, wherein at least one of the vertices comprises a loop, and wherein the machine executable code for allocating the data elements is subject to a further constraint on at least one of the edges outputting from the loop, specifying that an overspill region is left beyond an end of the memory addresses in which data output by the respective edge is to be stored.

18. A computer comprising a non-transitory machine readable medium storing a graph compiler arranged to run on the computer, the graph compiler being configured to perform the following actions when run on the computer:
compiling a graph into an executable program having machine code instructions, wherein the graph comprises a plurality of data nodes representing data elements, a plurality of compute vertices and a plurality of directional edges, further wherein the executable program has a multi-access instruction performing at least one item selected from the list consisting of: a plurality of load operations, a plurality of store operations, and a load and a store operation;
wherein compiling the graph includes:
assigning instances of the multi-access instructions to implement the edges, and
analyzing the graph, and in dependence upon a result of analyzing the graph, allocating the data elements to memory addresses within different memory banks, wherein the allocating applies a first constraint that no two edges can access a same memory bank at a same time;
wherein allocating the data elements comprises:
grouping the data elements into equivalence classes, wherein a first equivalence class includes a first set of the data elements that interfere with a second set of other ones of the data elements of a second equivalence class;
generating ordered equivalence classes at least in part by ordering the equivalence classes according to a metric; and
stepping through the data elements within the ordered equivalence classes to allocate each of the data elements in turn, wherein the graph compiler is further configured to perform the following actions: ordering the data elements within each equivalence class according to a second metric that is different from the first metric; and for each equivalence class, stepping through the ordered data elements within the ordered equivalence classes to allocate each of the data elements in turn.

19. The computer of claim 18, wherein allocating the data elements is subject to a further constraint on each of the edges outputting from a compute vertex, specifying that data output by the respective edge should be stored with a specified alignment with respect to the memory addresses.

20. The computer of claim 18, wherein allocating the data elements is subject to a further constraint on each of the edges outputting from a compute vertex, specifying that data output by the respective edge should be stored in a specified subset of a plurality of memory banks.

21. The computer of claim 18, wherein at least one of the vertices comprises a loop, and wherein allocating the data elements is subject to a further constraint on at least one of the edges outputting from the loop, specifying that an overspill region is left beyond an end of the memory addresses in which data output by the respective edge is to be stored.

* * * * *